United States Patent
Norwood et al.

(10) Patent No.: US 11,287,384 B2
(45) Date of Patent: Mar. 29, 2022

(54) SYSTEM AND METHOD FOR IMPROVING CALIBRATION TRANSFER BETWEEN MULTIPLE RAMAN ANALYZER INSTALLATIONS

(71) Applicant: Kaiser Optical Systems Inc., Ann Arbor, MI (US)

(72) Inventors: Timothy Norwood, Chelsea, MI (US); Joseph B. Slater, Dexter, MI (US); James M. Tedesco, Livonia, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 46 days.

(21) Appl. No.: 16/932,601

(22) Filed: Jul. 17, 2020

(65) Prior Publication Data

US 2022/0018780 A1    Jan. 20, 2022

(51) Int. Cl.
*G01N 21/65* (2006.01)
*G01N 21/64* (2006.01)

(52) U.S. Cl.
CPC ......... *G01N 21/65* (2013.01); *G01N 21/6402* (2013.01); *G01N 2201/06113* (2013.01);
(Continued)

(58) Field of Classification Search
CPC ......... G01N 2201/12746; G01N 21/65; G01N 2201/12753
See application file for complete search history.

(56) References Cited

U.S. PATENT DOCUMENTS 5,850,623 A * 12/1998 Carman, Jr ............... G01J 3/44
702/28
6,864,978 B1    3/2005 Hazen et al.
(Continued)

FOREIGN PATENT DOCUMENTS

CN    109060769 A  * 12/2018

OTHER PUBLICATIONS

Workman, Jr., Jerome J., A Review of Calibration Transfer Practices and Instrument Differences in Spectroscopy, Applied Spectroscopy, vol. 72(3), Oct. 25, 2017 (Oct. 25, 2017), pp. 340-365, XP055746662, US ISSN:0003-7028, DOI: 10.1177/0003702817736064, journals.sagepub.com/home/asp.

*Primary Examiner* — Maurice C Smith
(74) *Attorney, Agent, or Firm* — Kelly J. Smith; Endress+Hauser (USA) Holding Inc.

(57) ABSTRACT

A method for harmonizing the responses of a plurality of Raman analyzers includes steps of calibrating an intensity axis response of a spectrometer to a reference light source and measuring a laser wavelength of a laser using the spectrometer. The method also includes steps of measuring a fluorescence spectrum induced by the laser at the laser wavelength of a plurality of standard reference material samples using the spectrometer, measuring a temperature of each standard reference material sample while measuring the fluorescence spectrum, and correcting the fluorescence spectrum of each standard reference material sample based on the respective temperature. The method further includes steps of deploying each standard reference material sample in one of a plurality of field calibrator devices and calibrating the intensity axis of one of the Raman analyzers using one of the field calibrator devices and the corrected fluorescence spectrum of the respective standard reference material sample.

20 Claims, 7 Drawing Sheets

(52) U.S. Cl.
CPC ............... *G01N 2201/1211* (2013.01); *G01N 2201/12746* (2013.01); *G01N 2201/13* (2013.01)

(56) References Cited

U.S. PATENT DOCUMENTS

| | | |
|---|---|---|
| 2005/0287040 A1 | 12/2005 | Giebeler et al. |
| 2007/0159624 A1 | 7/2007 | Resch-Genger et al. |
| 2011/0211763 A1* | 9/2011 | Maier ...................... G01J 3/02 |
| | | 382/218 |
| 2012/0300205 A1* | 11/2012 | Misener .................... G01J 3/28 |
| | | 356/317 |

* cited by examiner

SYSTEM AND METHOD FOR IMPROVING CALIBRATION TRANSFER BETWEEN MULTIPLE RAMAN ANALYZER INSTALLATIONS

TECHNICAL FIELD

The present disclosure relates generally to spectroscopy and, in particular, to apparatus and methods to ensure reliable, repeatable and accurate results using spectral reference materials.

BACKGROUND OF THE INVENTION

Induced radiative effects such as Raman scattering and fluorescence have become extremely valuable tools associated with the non-destructive determination of molecular constituents. There are three primary components to any Raman system: an excitation source, a sampling apparatus, and a detector. Modern Raman instrumentation uses a laser as the excitation source, a spectrometer for the detector, and either a microscope or a fiber optic probe as the sampling apparatus.

Every Raman instrument has a unique spectral responsivity, making both the spectral shape and absolute intensity of a single sample different on every instrument and even on a single instrument at different times. Thus, it has become increasingly important to employ a procedure for the correction of the relative intensity of Raman spectra using, for example, a spectral reference material. In this procedure, the luminescence of an intensity standard, having a known relative irradiance, is used to establish an instrument response function. This function is then used to correct the sample spectrum to the true relative Raman intensity.

The National Institute of Standards and Technology (NIST) has developed a series of Standard Reference Materials (SRMs) for the calibration of Raman intensity. In particular, NIST provides a class of fluorescent glasses that can be used with a Raman system as intensity calibration light sources. These SRM glasses have some advantages over more traditional calibration light sources such as halogen bulbs (under the general category of black body radiators), in that they do not age or drift with time, do not require power (thus making them more suitable for field work), and allow more straightforward correction of sample system optics.

NIST SRMs are, however, sensitive to temperature and excitation wavelength. Also, the spectral profile of each piece of SRM is slightly different. Thus, each piece of SRM glass has to be characterized over temperature and wavelength to obtain a correction curve that allows each piece to be effectively "normalized." While in theory, all actual SRM emission spectra, when measured under the same conditions used to generate those curves (i.e., by NIST), are certified to fall within the uncertainty bands published in the NIST documentation, these bands vary across the emission spectrum to allow band shape variability on the order of a few percent. To ensure reliable, repeatable and accurate results, it would be advantageous to have a system and method to determine if the proper correction curve file for each piece of SRM is being used, thereby achieving a band shape variability better than a few percent.

SUMMARY OF THE INVENTION

This invention improves upon the calibration transfer between multiple Raman analyzer installations, thereby increasing analyzer-to-analyzer consistency without relying on the published calibration spectra and information provided with standard reference materials (SRMs). Use of this invention provides an improved degree of analyzer-to-analyzer variability based upon the actual emission spectrum of SRMs generated in the field across a deployment of multiple installations running the same Raman analysis, even when using different equipment in different environments. The objective is to achieve consistent results in the field when analyzing the same reference sample to a precision better than what the published SRM spectrum would alone provide.

The invention takes into consideration multiple factors that affect system-to-system results, including: 1. Sample-to-sample variability within SRM published uncertainty bands for a standard spectrum; 2. The temperature of the sample when different from the temperature at which the SRM was characterized; 3. Illumination geometry, particularly focus depth and numerical aperture; and 4. Laser excitation wavelength, the sensitivity of which is a function of the type of the SRM used.

The invention does not actually adjust or correct the SRM curves published by NIST, but instead replaces those curves with improved accuracy based upon independent measurements of each piece of reference glass under identical conditions. Although the effective "adjustment" that the method imparts with respect to a standard NIST curve may be obtained through subtraction, the invention actually derives an independent characterization of the reference material, which may inherently incorporate other considerations, such as illumination geometry.

As for analytical corrections such as temperature and/or laser wavelength dependence, the invention contemplates the distribution and use of a Raman Calibration Tool (RCT) and associated software to assist with intensity calibration across multiple analyzer installations. Use of the module provides an analytical adjustment based on a sample's measured temperature in the field versus its temperature when characterized in the lab. The same temperature correction transform equation as published in NIST documentation may be used, but over a wider temperature range than that certified by NIST, with the validity of the improved temperature characterization being confirmed experimentally over the wider temperature range.

Overall, the invention improves the precision of Raman analyzer calibration through temperature correction, focus control and cross validation with multiple sources. Placing the calibration material (i.e., SRM) in a sealed volume, and relaying the light into and out of the module reduces if not eliminates environmental contamination and degradation over time. As yet a further alternative, the SRM material may form part of a waveguide or mixing rod to reduce position sensitivity and increase calibration signal levels.

A method of improving the calibration transfer between multiple Raman analyzer installations, includes the step of providing a plurality of standard reference material (SRM) samples. A Raman reference spectrum is generated for each SRM sample under factory-controlled conditions using identical measurement instrumentation and measurement parameters. At least one of the SRM samples is provided to each of a plurality of Raman analyzer installations along with the measurement parameters and the Raman reference spectrum generated for each SRM sample. Each SRM reference sample is analyzed at a respective one of the Raman analyzer installations to generate a Raman calibration spectrum of the SRM sample, and the intensity axis of the Raman spectrometer at the installation is calibrated using the Raman calibration spectrum and the Raman reference spectrum.

In preferred embodiments, the SRM samples are existing fluorescent glasses, each provided with a published calibration spectrum.

The measurement parameters may include the temperature of the SRM sample at the time the Raman reference spectrum is generated, in which case the method may include the steps of measuring the temperature of the SRM sample when the calibration spectrum is generated, and correcting the installation calibration as a function of the difference between the temperature of the sample during the calibration and the temperature of the sample when the Raman reference spectrum was generated.

The measurement parameters may include the illumination geometry of the laser used to generate the Raman reference spectrum. For example, the illumination geometry of the laser may include the focal depth of the laser in the SRM sample. The method may include the steps of measuring the illumination geometry of the SRM sample when the calibration spectrum is generated, and correcting the installation calibration as a function of the difference between the geometry used to illuminate the sample during the calibration and the geometry used to illuminate the sample when the Raman reference spectrum was generated.

The measurement parameters may include the wavelength of the laser used to generate the Raman reference spectrum, whereby the method may include the steps of measuring the wavelength of the laser used to illuminate the SRM sample when the calibration spectrum is generated, and correcting the installation calibration as a function of the difference between the wavelength of the laser used to illuminate the sample during the calibration and the wavelength of the laser used to illuminate the sample when the Raman reference spectrum was generated.

The Raman reference spectrum may be stored in a memory or otherwise to the Raman analyzer being calibrated. The analyzer may then compare the Raman reference spectrum to the calibration spectrum generated by the Raman analyzer during illumination of the SRM sample so as to adjust the intensity axis of the Raman analyzer based on a difference between the reference spectrum and the calibration spectrum.

The method and system may include enclosing the SRM sample in a sealed field calibrator device for distribution to the Raman analyzer installations. The field calibrator device may include a port for insertion of a temperature probe to measure the temperature of the SRM sample when the calibration spectrum is generated. The field calibrator device may also include a port for insertion of a Raman probe to establish a predetermined depth of the focal point in the SRM sample.

BRIEF DESCRIPTION OF THE DRAWINGS

The described embodiments and other features, advantages, and disclosures contained herein, and the manner of attaining them, will become apparent and the present disclosure will be better understood by reference to the following description of various embodiments of the present disclosure taken in conjunction with the accompanying drawings, wherein.

DETAILED DESCRIPTION OF THE PREFERRED EMBODIMENTS

Various embodiments of the disclosure will now be presented and/or discussed in conjunction with the figures which illustrate the embodiments. It will be understood that no limitation of the scope of this disclosure is thereby intended.

The present disclosure describes a system and method for ensuring the accuracy of Raman analyzers, including harmonizing the response of multiple Raman analyzer deployments, particularly for similar process analyses. The present disclosure may find application in any of a variety of different types of spectrometers and/or analyzers, each of which may generally include or utilize an emission source which produces a spectrum, an optical system which collimates and disperses the spectrum, and a detecting device to measure the emitted lines intensities. The embodiments provided herein are not intended to limit the disclosure in any way.

Figure 1:
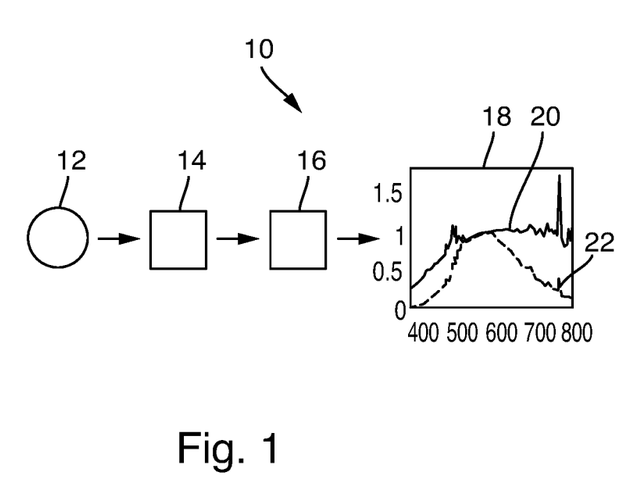
FIG. 1 shows a simplified schematic diagram of a reference light source and a spectrometer, configured for intensity axis response calibration of the spectrometer using the reference light source.

Turning now to FIG. 1, a simplified schematic diagram 10 of a reference light source 12 and a spectrometer 14 is shown. Also shown is a signal processor 16, which may or may not be integral with the spectrometer 14. The reference light source 12 may be any dedicated, stable, and calibrated light source. The spectrometer 14 may include various components for recording and measuring spectra. The signal processor 16 may include software offering various options for spectral processing. The reference light source 12, spectrometer 14, and signal processor 16 may be used to calibrate the intensity axis response of the spectrometer 14 to the reference light source 12. To calibrate the spectrometer 14, calibration data may be interpolated and applied against a measured spectrum to remove the system response.

On a graph 18 is shown an exemplary spectrum 20 produced by the reference light source 12, spectrometer 14, and signal processor 16, and a predetermined spectral profile 22 corresponding to the reference light source 12, such as one provided by NIST. Corrections may be made to the spectrometer 14 to calibrate the intensity axis response based on a comparison of the exemplary spectrum 20 to the predetermined spectral profile 22, or a correction curve (not shown) may be generated for use with the spectrometer 14 based on the comparison. The main objective of intensity calibration is to calibrate the y-axis, allowing the spectrometer 14 to detect and analyze a sample or light source independent of the system's spectral response.

Figure 2:
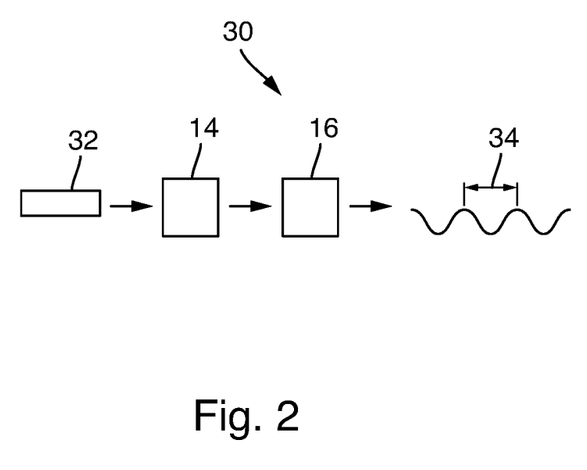
FIG. 2 shows a simplified schematic diagram of a laser and the spectrometer, configured for measuring a laser wavelength of the laser using the calibrated spectrometer.

Turning to FIG. 2, a simplified schematic diagram 30 is shown including a laser 32 with the spectrometer 14 and the signal processor 16. The laser 32 is an exemplary device that emits light through a process of optical amplification based on the simulated emission of electromagnetic radiation. According to the diagram 30 of FIG. 2, the laser 32, calibrated spectrometer 14, and signal processor 16 may be configured to measure a laser wavelength 34 of the laser 32 using the calibrated spectrometer 14.

Figure 3:
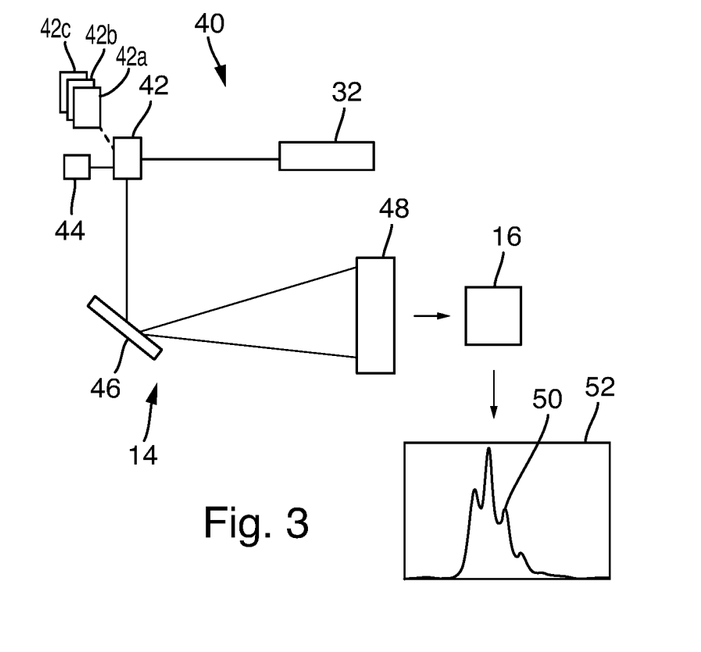
FIG. 3 shows a schematic diagram of a spectroscopy system including the spectrometer and the laser of FIGS. 1 and 2, configured for measuring a fluorescence spectrum of each of a plurality of standard reference material samples.

An exemplary spectroscopy system 40 is shown in FIG. 3 and generally includes a laser 32, a sample 42, a temperature measuring device 44, diffraction grating 46, a detector 48, and signal processor 16. The calibrated spectrometer 14 may be represented by one or more of a support for the sample 42, the temperature measuring device 44, the diffraction grating 46, the detector 48, and the signal processor 16. As described above, an intensity axis response of the calibrated spectrometer 14 has been calibrated to the reference light source 12 and the laser wavelength 34 of the laser 32 has been measured using the spectrometer 14.

The sample 42 may be one of a plurality of standard reference material samples 42a, 42b, and 42c, which have sample-to-sample variation, to be analyzed using the spectroscopy system 40. According to an exemplary embodiment, the standard reference material samples 42a, 42b, and 42c may include NIST traceable luminescent materials, such as, for example, fluorescent SRM glass pieces. In some instances, a unique standard temperature and wavelength corrected spectrum may be provided with each of the standard reference material samples 42a, 42b, and 42c.

The spectroscopy system 40 may be used to measure a unique standard reference material fluorescence spectrum 50, as shown in graph 52, induced by the laser 32 at the laser wavelength 34 of each of the plurality of standard reference material samples 42a, 42b, and 42c using the calibrated spectrometer 14. The laser 32 and calibrated spectrometer 14 may be interfaced to the plurality of standard reference material samples 42a, 42b, and 42c with a controlled excitation/collection numerical aperture and focus position representative of that which will be used in-field calibrations of multiple Raman analyzers, discussed below, using the plurality of standard reference material samples 42a, 42b, 42c.

Figure 4:
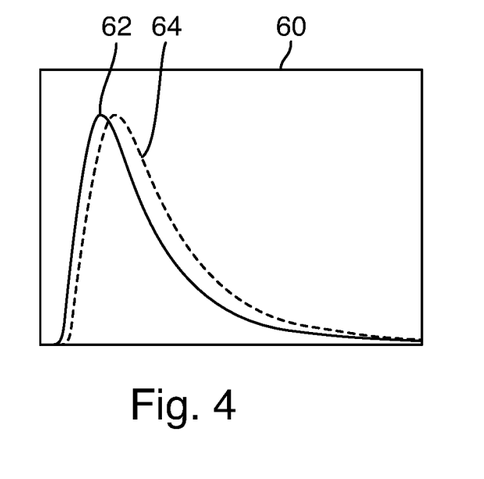
FIG. 4 shows a chart depicting an exemplary fluorescence spectrum, measured by the spectrometer, and an exemplary temperature corrected fluorescence spectrum.

The spectroscopy system 40 may also include the temperature measuring device 44 positioned and configured to measure the temperature of one of the standard reference material samples 42a, 42b, and 42c while it is being analyzed using the spectroscopy system 40. In particular, the temperature of each standard reference material sample 42a, 42b, and 42c may be measured while the spectroscopy system 40 is measuring the fluorescence spectrum 50 of the respective standard reference material sample 42a, 42b, and 42c. The fluorescence spectrum 50 of each of the standard reference material samples 42a, 42b, and 42c may then be corrected based on the respective temperature. For example, and with reference to a graph 60 of FIG. 4, a fluorescence spectrum 62 of each of the standard reference material samples 42a, 42b, and 42c may be adjusted to a corrected fluorescence spectrum 64 based on a standard temperature, such as by using previously characterized temperature dependence of the fluorescence spectrum 62.

Figure 5:
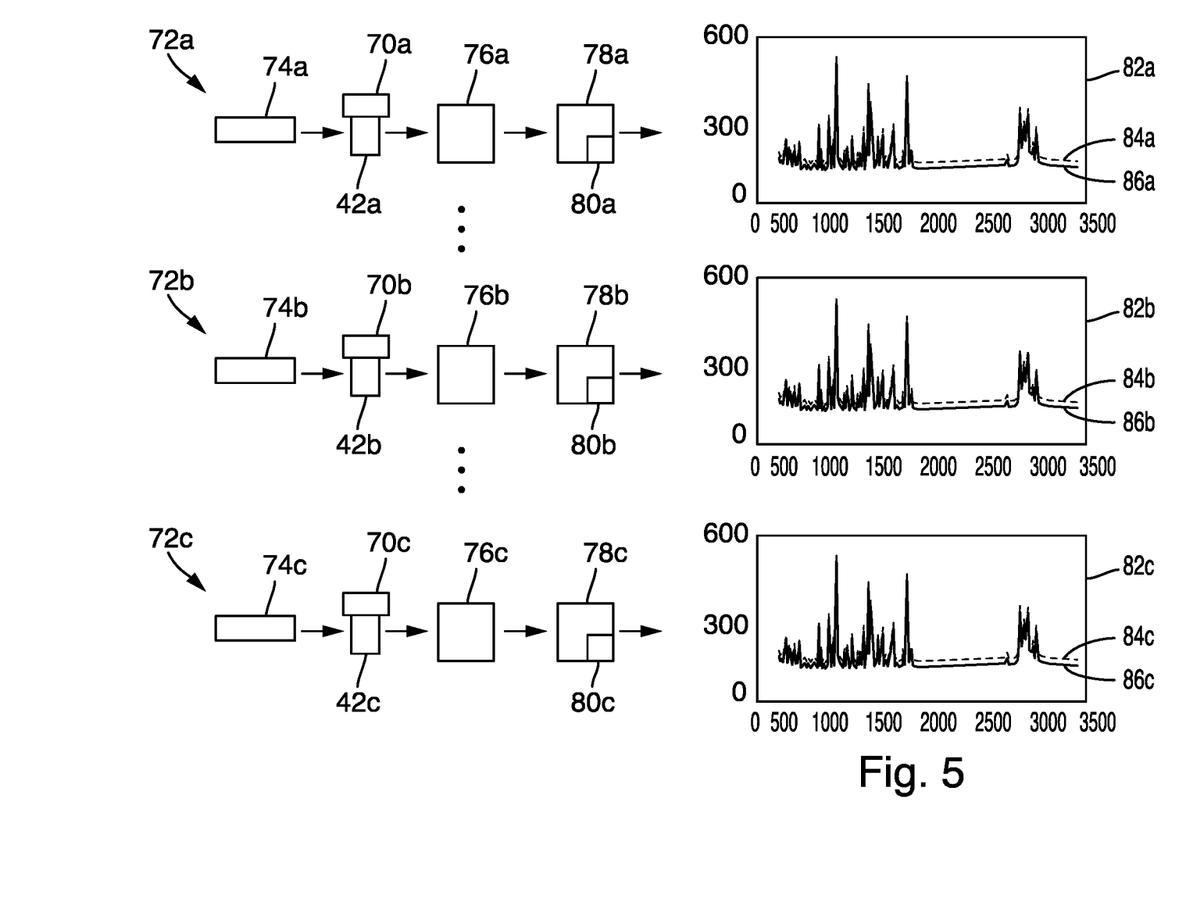
FIG. 5 shows a plurality of Raman analyzers configured for calibration using the standard reference material samples and the corrected fluorescence spectrum of a respective one of the standard reference material samples.

Next, each of the standard reference material samples 42a, 42b, and 42c may be deployed in one of a plurality of field calibrator devices 70a, 70b, and 70c, as shown in FIG. 5, in order to calibrate a plurality of Raman analyzers 72a, 72b, and 72c. According to one embodiment, each of the field calibrator devices 70a, 70b, and 70c may include one of the standard reference material samples 42a, 42b, and 42c, a temperature measuring device, and an opto-mechanical interface ensuring common focal depth of a collection probe of the respective Raman analyzer 72a, 72b, and 72c in the respective standard reference material sample 42a, 42b, and 42c.

Each Raman analyzer 72a, 72b, and 72c may include or use a respective laser 74a, 74b, and 74c operating at the laser wavelength, one of the field calibrator devices 70a, 70b, and 70c supporting one of the standard reference material samples 42a, 42b, and 42c, spectrometers 76a, 76b, and 76c, and signal processors 78a, 78b, and 78c, including memories 80a, 80b, and 80c. Memories 80a, 80b, and 80c may store corrected fluorescence spectrums 86a, 86b, and 86c.

Calibration spectra 84a, 84b, and 84c produced by the Raman analyzers 72a, 72b, and 72c is shown in the graphs of FIG. 5 along with corrected fluorescence spectra 86a, 86b, and 86c of the respective standard reference material samples 42a, 42b, 42c. In accordance with the invention, Raman analyzers 72a, 72b, and 72c are calibrated using the spectra 84a, 84b, and 84c and the corrected fluorescence spectra 86a, 86b, and 86c of the respective standard reference material sample 42a, 42b, and 42c. That is, the Raman analyzers 72a, 72b, and 72c may be corrected based on differences between the spectra 84a, 84b, and 84c and the corrected fluorescence spectrum 86a, 86b, and 86c.

According to one embodiment, a calibration temperature of the standard reference material samples 42a, 42b, and 42c may be measured during calibration of the Raman analyzers 72a, 72b, and 72c. A standard temperature spectrum of the respective field calibrator device 70a, 70b, and 70c may be corrected based on the calibration temperature.

According to another embodiment, a calibration wavelength of the Raman analyzers 72a, 72b, and 72c may be measured, and a standard excitation wavelength spectrum of the respective field calibrator 70a, 70b, and 70c may be corrected based on the calibration wavelength.

If the unique standard temperature and wavelength corrected spectrum is provided with each of the standard reference material samples 42a, 42b, and 42c, a calibration wavelength of the Raman analyzers 72a, 72b, and 72c may be measured, and a unique standard reference material sample fluorescence spectrum of the respective field calibrator device 70a, 70b, and 70c may be corrected based on the calibration wavelength and the unique standard temperature and wavelength corrected spectrum of the respective standard reference material sample 42a, 42b, and 42c.

Figure 6:
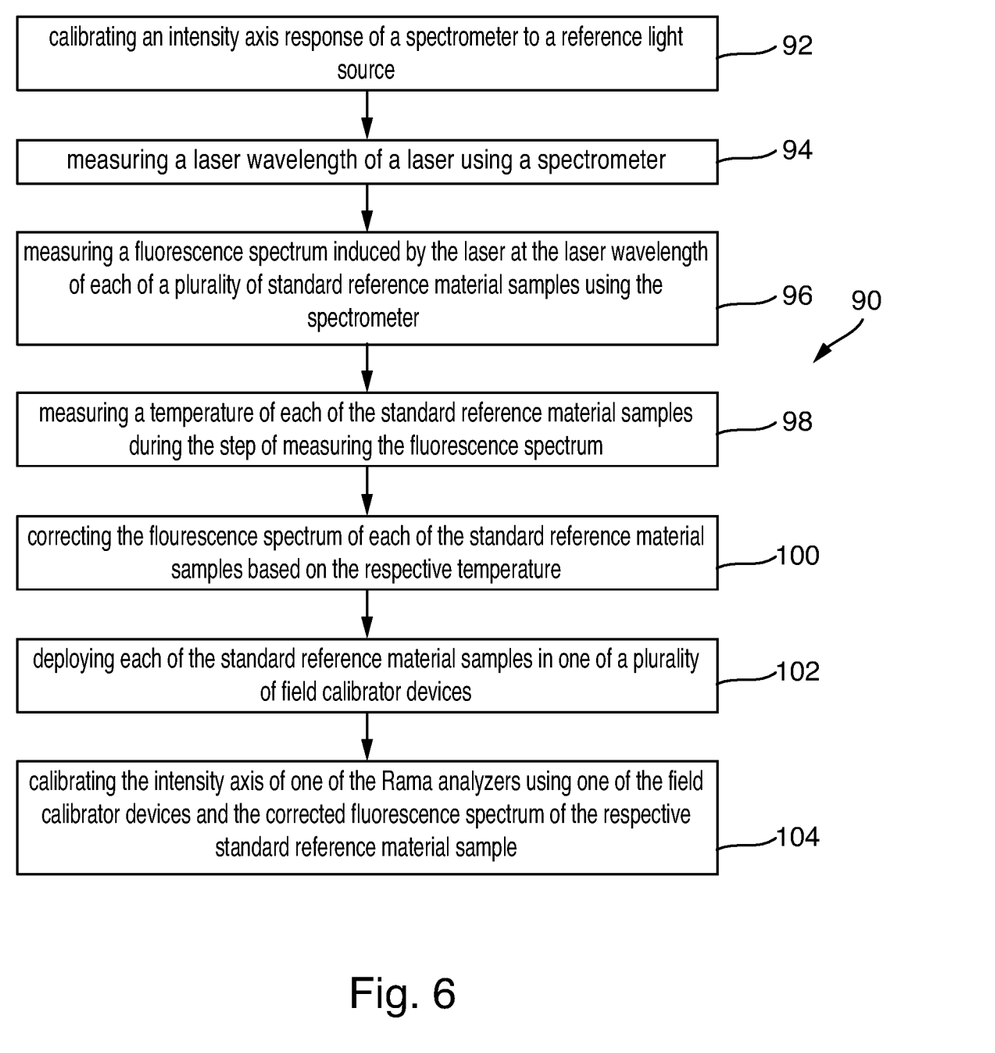
FIG. 6 shows a flow diagram of a method for harmonizing responses of the plurality of Raman analyzers, according to the present disclosure.

The method described above is recited below, with reference to a flow diagram 90 of FIG. 6. The method includes a step of calibrating an intensity axis response of a spectrometer 14 to a reference light source 12, at box 92. In particular, a spectrum 20 produced by the reference light source 12 is compared to a predetermined spectral profile 22 corresponding to the reference light source 12. The difference between the spectrum 20 and the predetermined spectral profile 22 is used to adjust or correct the spectral response of the spectrometer 14. The method also includes a step of measuring a laser wavelength 34 of a laser 32 using the spectrometer 14, at box 94, where the laser 32 is representative of the lasers in deployed Raman analyzers 72a, 72b, and 72c.

Next, at box 96, the method includes a step of measuring a fluorescence spectrum 50 induced by the laser 32 at the laser wavelength 34 of each of a plurality of standard reference material samples 42a, 42b, and 42c using the spectrometer 14. The method also includes steps of measuring a temperature of each of the standard reference material samples 42a, 42b, and 42c during the step of measuring the fluorescence spectrum 50 (box 98) and correcting the fluorescence spectrum 50 of each of the standard reference material samples 42a, 42b, and 42c based on the respective temperature (box 100).

Thereafter, at box 102, the method includes deploying each of the standard reference material samples 42a, 42b, and 42c in one of a plurality of field calibrator devices 70a, 70b, and 70c. The method further includes a step of calibrating the intensity axis of one of the Raman analyzers 72a, 72b, and 72c using one of the field calibrator devices 70a, 70b, and 70c and the corrected fluorescence spectrum 86a, 86b, and 86c of the respective standard reference material sample 42a, 42b, and 42c, at box 104.

As stated above, each spectrometer, spectroscopy system, or analyzer has a unique spectral response, impacted by the spectral modification caused by the optical elements along the light path, such as, for example, lenses, mirrors and/or detectors. Thus, a spectrometer for use in spectroscopic analysis should be calibrated, such as by using a spectral reference material. That is, the spectrometer may collect a spectrum of light passing through a spectral reference material having a known spectral signature to adjust, or correct, the spectral response. This calibration is important for obtaining consistent results from device to device. However, there may be sample-to-sample variation in the spectral reference material and other factors that may cause inconsistent results from device to device.

To assist with analyzer-to-analyzer calibration, an apparatus aspect of this invention includes a Raman Calibration Tool (RCT) configured for distribution and use in the field. When used in conjunction with accompanying calibration protocols, including those described herein, the RCT allows different instruments to be standardized such that they generate precise spectra in terms of intensity when measuring a given sample. Thus, "standardization" refers to the process of using radiometric means to normalize the relevant performance of individual analyzers such that spectral, and hence chemical, models can be transferred to multiple analyzers.

Figure 7A:
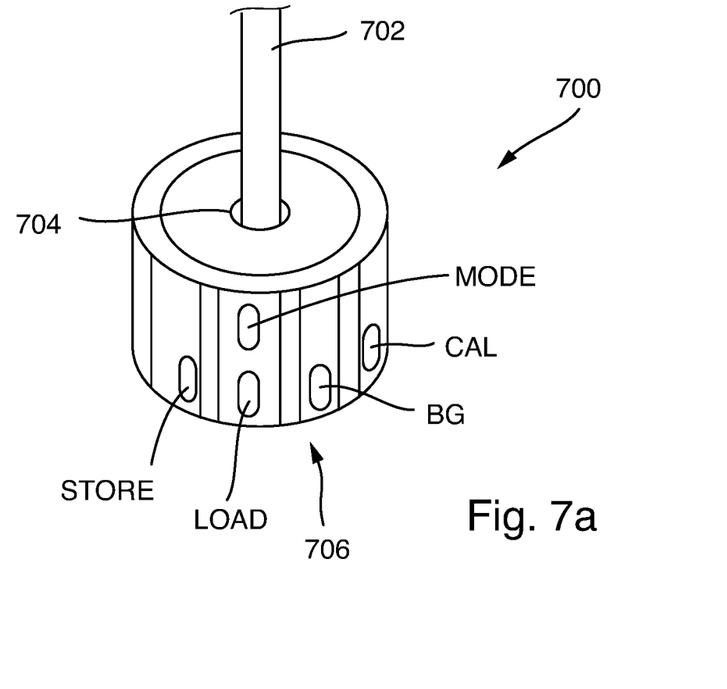
FIG. 7A illustrates a field calibrator module containing a NIST fluorescent glass standard reference material (SRM) providing a factory-characterized spectral output used for intensity standardization of Raman instruments and analyzers.

FIG. 7A is a drawing of an RCT containing a NIST fluorescent glass standard reference material providing a factory-characterized spectral output used for intensity standardization of Raman instruments and analyzers. A wavelength-specific SRM is required for each Raman excitation wavelength associated with the standardization process. For example, SRM-532 is used for 534.5 to 694.0 nm; SRM-785: 790.7 to 1074.5 nm; and SRM-1000: 1012.6 to 1304.6 nm.

The RCT device has an upper portion with a port for insertion of a Raman probe, and a lower portion (not shown), with a window that indicates the status of an internal color-changing desiccant. The standard RCT interfaces with ½" probe tips, though the module may be engineered for alternative sizes. The desiccant humidity indicator is provided to avoid degradation of the fluorescent glass disposed within the housing.

The upper and lower portions of the RCT are rotatable with respect to one another to select one of four distinct modes for the unit. Mode selection is accomplished by slightly pulling the two parts of the unit apart and rotating the two relative to each other until the mode selection arrow is pointing to one of the following modes:

STORE: This mode moves a dust cover into place to protect the probe or the RCT calibration accessory;

LOAD: This mode is used for loading the unit onto a probe until it bottoms out at a fixed, predetermined distance from the reference material;

CAL: The CALIBRATE mode is used to actually present the fluorescent glass to the probe; and BG: The BACKGROUND setting enables the RCT to capture the probe's background signal to account for probe-to-probe background variation when standardizing an instrument.

Figure 7B:
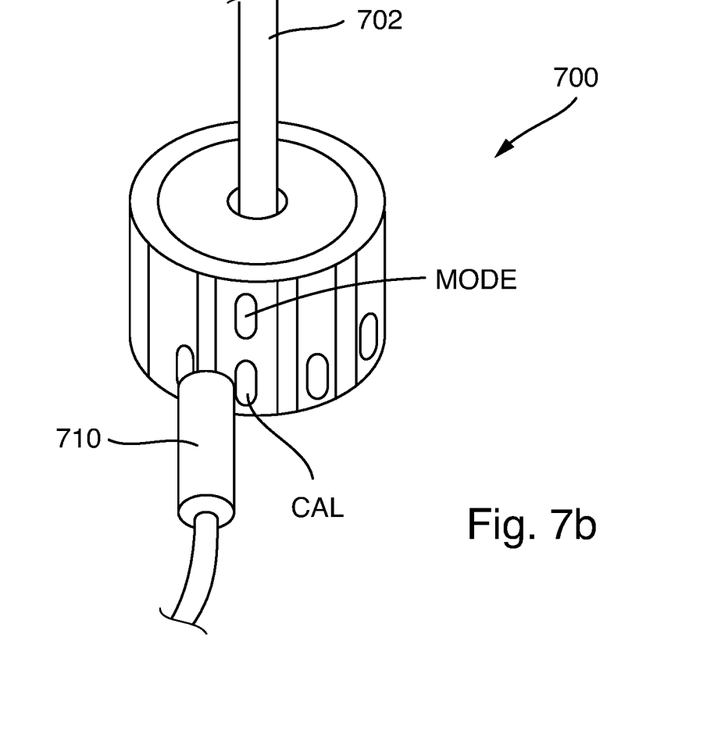
FIG. 7B depicts the field calibrator module of FIG. 7A including the insertion of a temperature probe to measure the temperature of the SRM during a calibration procedure.

FIG. 7B shows the RCT with a temperature measurement probe 710 inserted into the device 700 to determine the temperature of the NIST glass during the calibration process.

Each RCT is supplied with a source spectral file (SSF) that describes the relative spectral output of the device as measured with the probe tip in contact with the NIST SRM. The software used to operate Kaiser analyzers is configured to directly read the device's SSF in the instrument standardization process. The SSF is relative and not absolute, such that the use of RCT only corrects the normalized shape of measured spectra and not the absolute magnitude. The intensity standardization process nevertheless corrects for instrument-to-instrument response variations, including the removal of fixed-pattern "noise" caused by pixel-to-pixel variations in the response of individual CCD detectors; spectral variations in signal intensity due to optical components, and spectral variations in the quantum efficiency of the CCD camera used in the spectrometer.

A summary of the recommended calibration/qualification sequence is as follows:

1 Wavelength calibration (Neon standard);

2 Intensity calibration/standardization (Intensity standard);

3 Probe background standardization (Probe BG);

4 Laser wavelength calibration (Raman shift standard);

5 Calibration qualification (Raman shift standard);

The system and method described herein may be used to normalize fluorescent glass spectral reference material to harmonize the response of multiple process Raman analyzer deployments for similar process analyses. Improved calibration transfer, or precision, when deploying multiple samples of fluorescent glass spectral reference material may be attained by measuring and correcting for sample-to-sample variability. This sample-to-sample variation is accounted for using the system and method described herein.

While particular embodiments of a spectrometer, including systems and components, have been described in considerable detail herein, the embodiments are merely offered by way of non-limiting examples of the disclosure described herein. It will therefore be understood that various changes and modifications may be made, and equivalents may be substituted for elements and steps thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Such sequences may be varied and still remain within the scope of the present disclosure. Therefore, the particular order of the steps disclosed herein should not be construed as limitations of the present disclosure.

The invention claimed is:

1. A method of improving calibration transfer between multiple Raman analyzer installations, each installation having a laser with a wavelength for illuminating a sample and a spectrometer for generating a Raman spectrum of a sample, the method comprising the steps of:
    providing a plurality of standard reference material (SRM) samples;
    generating a Raman reference spectrum for each SRM sample under factory-controlled conditions using identical measurement instrumentation and measurement parameters;
    distributing at least one of the SRM samples to each of the plurality of Raman analyzer installations along with the measurement parameters and the Raman reference spectrum generated for each SRM sample;
    analyzing each SRM reference sample at a respective one of the Raman analyzer installations to generate a Raman calibration spectrum of the SRM sample; and
    calibrating the intensity axis of the Raman spectrometer at the installation using the Raman calibration spectrum and the Raman reference spectrum.

2. The method of claim 1, wherein the SRM samples are existing fluorescent glasses, each provided with a published calibration spectrum.

3. The method of claim 1, wherein the measurement parameters include the temperature of the SRM sample at the time the Raman reference spectrum is generated.

4. The method of claim 3, including the steps of:
    measuring the temperature of the SRM sample when the calibration spectrum is generated; and
    correcting the installation calibration as a function of the difference between the temperature of the sample during the calibration and the temperature of the sample when the Raman reference spectrum was generated.

5. The method of claim 1, wherein the measurement parameters include the illumination geometry of the laser used to generate the Raman reference spectrum.

6. The method of claim 5, wherein the illumination geometry of the laser includes the focal depth of the laser in the SRM sample.

7. The method of claim 5, including the steps of:
    measuring the illumination geometry of the SRM sample when the calibration spectrum is generated; and
    correcting the installation calibration as a function of the difference between the geometry used to illuminate the sample during the calibration and the geometry used to illuminate the sample when the Raman reference spectrum was generated.

8. The method of claim 1, wherein the measurement parameters include the wavelength of the laser used to generate the Raman reference spectrum.

9. The method of claim 8, including the steps of:
    measuring the wavelength of the laser used to illuminate the SRM sample when the calibration spectrum is generated; and
    correcting the installation calibration as a function of the difference between the wavelength of the laser used to illuminate the sample during the calibration and the wavelength of the laser used to illuminate the sample when the Raman reference spectrum was generated.

10. The method of claim 1, including the steps of:
    storing the Raman reference spectrum in a memory;
    transferring the Raman reference spectrum to the Raman analyzer being calibrated;
    comparing the Raman reference spectrum to the calibration spectrum generated by the Raman analyzer during illumination of the SRM sample; and
    adjusting the intensity axis of the Raman analyzer based on a difference between the reference spectrum stored in the memory and the calibration spectrum.

11. The method of claim 1, further including the steps of:
    enclosing the SRM sample in a sealed field calibrator device; and
    distributing at least one of the field calibrator devices to each of the plurality of Raman analyzer installations.

12. The method of claim 11, wherein the field calibrator devices include a port for insertion of a temperature probe to measure the temperature of the SRM sample when the calibration spectrum is generated.

13. The method of claim 11, wherein:
    the field calibrator devices include a port for insertion of a Raman probe having a focal point; and
    the insertion of the probe establishes a predetermined depth of the focal point in the SRM sample.

14. A system for harmonizing the responses of a plurality of Raman analyzers, comprising steps of:
    a spectrometer having an intensity axis response calibrated to a reference light source;
    a laser having a laser wavelength measured using the spectrometer;
    a plurality of standard reference material (SRM) samples;
    the spectrometer measuring a Raman reference spectrum of each SRM sample induced by the laser at the laser wavelength;
    wherein each SRM sample is deployed in a respective sealed field calibrator device for distribution and use by each analyzer to generate a Raman calibration spectrum; and
    wherein the intensity axis of each Raman analyzer is calibrated using the using the Raman calibration spectrum and the Raman reference spectrum.

15. The system of claim 14, wherein the SRM sample is a fluorescent glass and the Raman calibration and reference spectra are fluorescence spectra.

16. The system of claim 14, wherein the intensity axis of the Raman analyzer is adjusted based on a difference between the Raman calibration and reference spectra.

17. The system of claim 14, further including:
    a temperature probe insertable into the field calibrator device for measuring a calibration temperature of the SRM sample at each analyzer; and
    wherein the analyzer calibration is corrected as a function of the difference between the temperature of the sample during the calibration and the temperature of the sample when the Raman reference spectrum was generated.

18. The system of claim 14, further including:
    a device for measuring the wavelength of the laser used to illuminate the SRM sample when the calibration spectrum is generated; and
    wherein the analyzer calibration is corrected as a function of the difference between the wavelength of the laser used to illuminate the sample during the calibration and the wavelength of the laser used to illuminate the sample when the Raman reference spectrum was generated.

19. The system of claim 14, wherein:
the field calibrator devices include a port for insertion of a Raman probe having a focal point; and
the insertion of the probe establishes a predetermined depth of the focal point in the SRM sample.

20. The system of claim 14, wherein the calibration spectrum is stored in a memory and distributed to the respective analyzers in conjunction with the field calibrator device.

\* \* \* \* \*